United States Patent
Ando et al.

(10) Patent No.: US 11,105,292 B2
(45) Date of Patent: Aug. 31, 2021

(54) HUMIDITY MEASUREMENT DEVICE

(71) Applicant: HITACHI AUTOMOTIVE SYSTEMS, LTD., Hitachinaka (JP)

(72) Inventors: Ryo Ando, Hitachinaka (JP); Hiroshi Onuki, Hitachinaka (JP); Yoshiyuki Akiyama, Hitachinaka (JP); Shigenobu Komatsu, Hitachinaka (JP); Takeo Hosokawa, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 140 days.

(21) Appl. No.: 16/494,067

(22) PCT Filed: Mar. 8, 2018

(86) PCT No.: PCT/JP2018/008905
§ 371 (c)(1),
(2) Date: Sep. 13, 2019

(87) PCT Pub. No.: WO2018/193743
PCT Pub. Date: Oct. 25, 2018

(65) Prior Publication Data
US 2021/0123394 A1  Apr. 29, 2021

(30) Foreign Application Priority Data
Apr. 21, 2017 (JP) .............................. JP2017-084119

(51) Int. Cl.
*F02D 41/30* (2006.01)
*F02M 35/10* (2006.01)
*G01N 25/58* (2006.01)

(52) U.S. Cl.
CPC ..... *F02D 41/3005* (2013.01); *F02M 35/1038* (2013.01); *F02M 35/10393* (2013.01);
(Continued)

(58) Field of Classification Search
CPC ............ F02D 41/3005; F02D 35/1038; F02D 35/10393; F02D 2200/0406;
(Continued)

(56) References Cited

U.S. PATENT DOCUMENTS

2005/0279919 A1* 12/2005 Tanaka ................... G01F 1/6845
250/214.1
2005/0284216 A1* 12/2005 Tanaka .................... G01F 1/692
73/204.26
(Continued)

FOREIGN PATENT DOCUMENTS

JP  56-69553 A  6/1981
JP  S60-158134 U  10/1985
(Continued)

OTHER PUBLICATIONS

International Search Report with English translation and Written Opinion issued in corresponding application No. PCT/JP2018/008905 dated Jun. 26, 2018.

*Primary Examiner* — Mahmoud Gimie
(74) *Attorney, Agent, or Firm* — Foley & Lardner LLP

(57) ABSTRACT

According to the conventional knowledge, a thermal humidity measurement device has problems in which the direction of air flow is limited to one direction is too hard to handle in securing the humidity responsiveness because there are limitations on the mounting direction of the thermal humidity measurement device and the state of air flow.
An introduction guide protrudes from an air introduction surface to the outside of a measurement chamber, is parallel to a humidity introduction port surface, and has a portion not in contact with an inlet surface of a humidity introduction tube as seen from any direction to guide the flow of air to the humidity introduction tube from any direction of 360°.

12 Claims, 9 Drawing Sheets

(52) U.S. Cl.
CPC ..... *G01N 25/58* (2013.01); *F02D 2200/0406* (2013.01); *F02D 2200/0414* (2013.01); *F02D 2200/0418* (2013.01)

(58) Field of Classification Search
CPC .... F02D 2200/0414; F02D 2200/0418; G01N 25/58; G01N 27/121; F02M 26/46
USPC ................. 701/103; 73/29.01, 335.05, 29.02
See application file for complete search history.

(56) References Cited

U.S. PATENT DOCUMENTS

| | | | |
|---|---|---|---|
| 2006/0037404 A1 | 2/2006 | Watanabe | |
| 2008/0190209 A1* | 8/2008 | Baba | G01L 19/0645 73/754 |
| 2012/0085324 A1* | 4/2012 | Saito | G01F 5/00 123/494 |
| 2012/0198925 A1* | 8/2012 | Saito | G01F 5/00 73/114.33 |
| 2012/0198943 A1* | 8/2012 | Saito | G01L 23/24 73/861.42 |
| 2014/0216146 A1 | 8/2014 | Yogo | |
| 2014/0283596 A1* | 9/2014 | Hosokawa | F02M 35/10393 73/335.02 |
| 2015/0114098 A1* | 4/2015 | Kamiya | G01F 15/043 73/114.34 |
| 2015/0354512 A1 | 12/2015 | Tsujii | |
| 2016/0202200 A1 | 7/2016 | Nakano | |
| 2018/0188088 A1* | 7/2018 | Nakano | G01F 1/696 |

FOREIGN PATENT DOCUMENTS

| | | |
|---|---|---|
| JP | 2004-233320 A | 8/2004 |
| JP | 2006-58137 A | 3/2006 |
| JP | 2010-190835 A | 9/2010 |
| JP | 2015-45515 A | 3/2015 |
| JP | 2015-232514 A | 12/2015 |
| JP | 2016-31341 A | 3/2016 |
| WO | WO-2013/042458 A1 | 3/2013 |
| WO | WO-2017/043263 A1 | 3/2017 |

* cited by examiner (a)

(b)

(c)

HUMIDITY MEASUREMENT DEVICE

TECHNICAL FIELD

The present invention relates to a humidity measurement device mounted on various devices to be measured to detect humidity.

BACKGROUND ART

Humidity measurement devices are used in various technical fields. In particular, in an internal combustion engine of an automobile, a humidity measurement device is mounted in an intake passage to measures the humidity of intake air. The measured humidity is used for control of a fuel injection amount and optimization of operating conditions.

Humidity measurement devices are used in various technical fields. In order to reduce fuel consumption in an internal combustion engines for automobiles and the like, there is demand for high-accuracy measurement of environmental conditions such as the humidity of the intake air in addition to the flow rate, temperature, and pressure of the intake air.

At the measurement of humidity in an internal combustion engine for automobile, the humidity measurement device is required to have detection accuracy and quick response. As an example of a solution to this issue, there is the technique described in PTL 1, for example. PTL 1 proposes a means for positively flowing the air in the vicinity of the humidity detection element, preventing retention of the air, and improving the responsiveness of humidity.

CITATION LIST

Patent Literatures

PTL 1: JP 2015-232514 A

SUMMARY OF INVENTION

Technical Problem

In recent years, mounting layout in the engine rooms of automobiles has been becoming difficult due to increase in the number of mounted parts along with downsizing and sophistication. For this reason, there is a demand for a humidity sensor that can be mounted in a free direction. According to PTL 1, when the flow of air is in only one direction, the humidity sensor can be considered as a solution for achieving both high-accuracy measurement with low noise and high-speed response. However, since the flow direction of air is limited, the mounting direction of the humidity detection device is limited.

The present invention solves the above-mentioned problem, and an object of the present invention is to provide a thermal humidity measurement device that achieves both high-accuracy measurement with little noise due to the flow of air and high-speed response regardless of the direction of air flowing into an intake pipe in an intake system of an internal combustion engine.

Solution to Problem

In order to solve the above-mentioned problem, in the humidity measurement device of the present invention, an introduction guide protrudes from an air introduction surface to the outside of a measurement chamber, is parallel to a humidity introduction port surface, and has a portion not in contact with an inlet surface of a humidity introduction tube as seen from any direction to guide the flow of air to the humidity introduction tube from any direction of 360°.

Thereby, even in the case of measuring the humidity of air flowing in the intake pipe in the air supply system of an internal combustion engine, for example, it is possible to achieve both prevention of noise to a humidity signal caused by the flow of air and high-speed response to humidity changes of the air flowing in the intake pipe, regardless of the direction of the air flow or the mounting direction of the thermal humidity measurement device.

Advantageous Effects of Invention

According to the present invention, it is possible to obtain a humidity measurement device which achieves both high-accuracy humidity measurement with little noise and high-speed response to humidity change, not depending on the direction of air flow or the mounting direction of the thermal humidity measurement device.

DESCRIPTION OF EMBODIMENTS

Examples of the present invention will be described below with reference to the drawings. These examples can be combined, and the description of the same configurations and effects as those of the already described examples will be omitted.

First Example

A first example of the present invention will be described with reference to FIGS. 1 to 3 and 10. In the present example, as a humidity detection element, a thermal humidity detection element that detects humidity by measuring a change in heat conduction of a measurement medium based on the amount of heat released from a heating element exposed to the measurement medium is taken as an example. However, a dielectric humidity detection element may be used instead.

Figure 10:
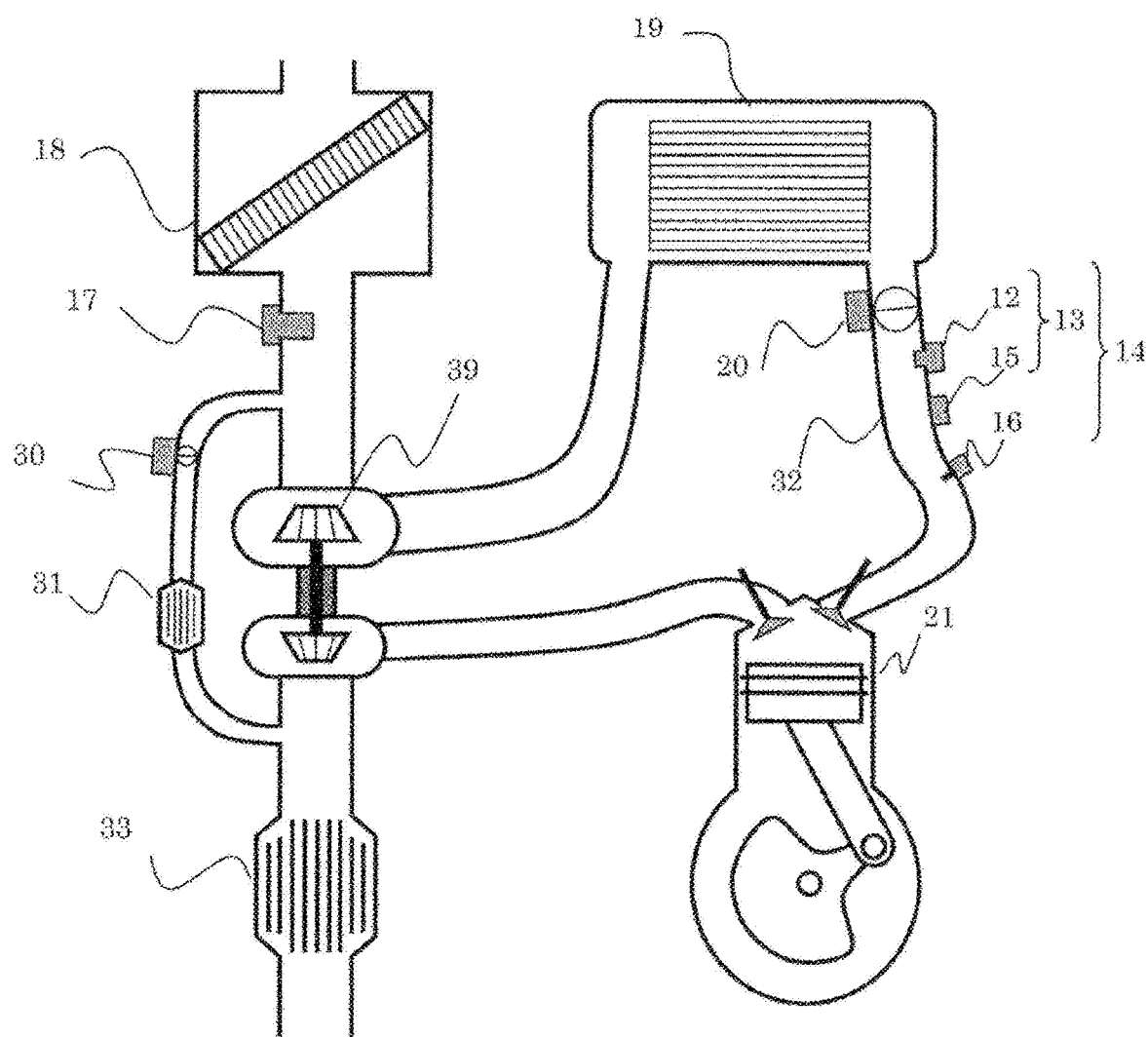
FIG. 10 is a schematic view of an internal combustion engine.

FIG. 10 illustrates a schematic view of an example of an internal combustion engine. An air flow sensor 17 for measuring the air downstream of an air cleaner 18 is mounted. A throttle valve 20 is disposed downstream of an intercooler 19 for cooling the air compressed by a turbocharger 39, and an intake manifold 32 connects the throttle valve 20 to a combustion chamber 21. The intake manifold 32 is equipped with a thermal humidity measurement device 12, pressure measurement device 15, and a temperature measurement device 16 for respectively measuring humidity, pressure and temperature. An EGR valve and an EGR cooler 31 are provided to circulate the exhaust gas to the intake side.

Figure 1:
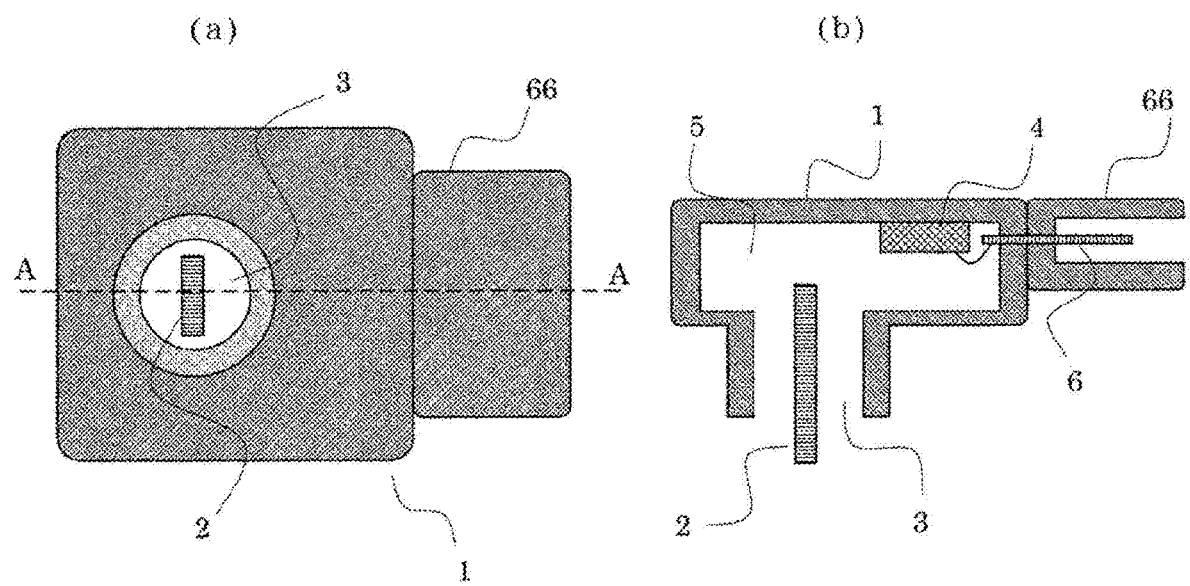
FIG. 1(a) is schematic bottom view and FIG. 1(b) is a schematic cross-sectional view along A-A of a first example of the present invention.

As illustrated in FIG. 1, a thermal humidity detection device 1 of the present example includes: a thermal humidity detection element 4; a measurement chamber in which the thermal humidity detection element 4 is arranged; an air introduction pipe 3 that introduces air into the measurement chamber 5; an air introduction guide 2 that at least partially protrudes from an inlet opening 3(b) of the air introduction pipe 3 and guides a measurement medium to the measurement chamber 5; and a connection terminal 6 for exchange of electrical signals with the outside.

The air introduction guide 2 is disposed in the air introduction pipe 3 and is configured to actively replace the air in the measurement chamber 5.

In the present example, the air introduction guide 2 is not in contact with the inlet opening 3(b) of the air introduction pipe 3. In other words, when viewed from a direction perpendicular to the air introduction direction, the air introduction guide 2 has a portion not in contact with the inlet of the air introduction pipe 3 in all directions of 360°. That is, an inlet portion 3(c) to the air introduction pipe 3 surely exists more outside than the air introduction guide 2 as viewed from any direction perpendicular to the introduction direction such that the air having collided with the air introduction guide 2 is guided to the air introduction pipe 3.

According to this configuration, the air that has collided with the air introduction guide 2 can be introduced into the air introduction pipe 3 as viewed from any direction of 360°. Therefore, the air can be introduced to the humidity detection element 4 regardless of the direction of the air flow, thereby ensuring high-speed response to humidity changes of the measurement target medium.

Figure 2:
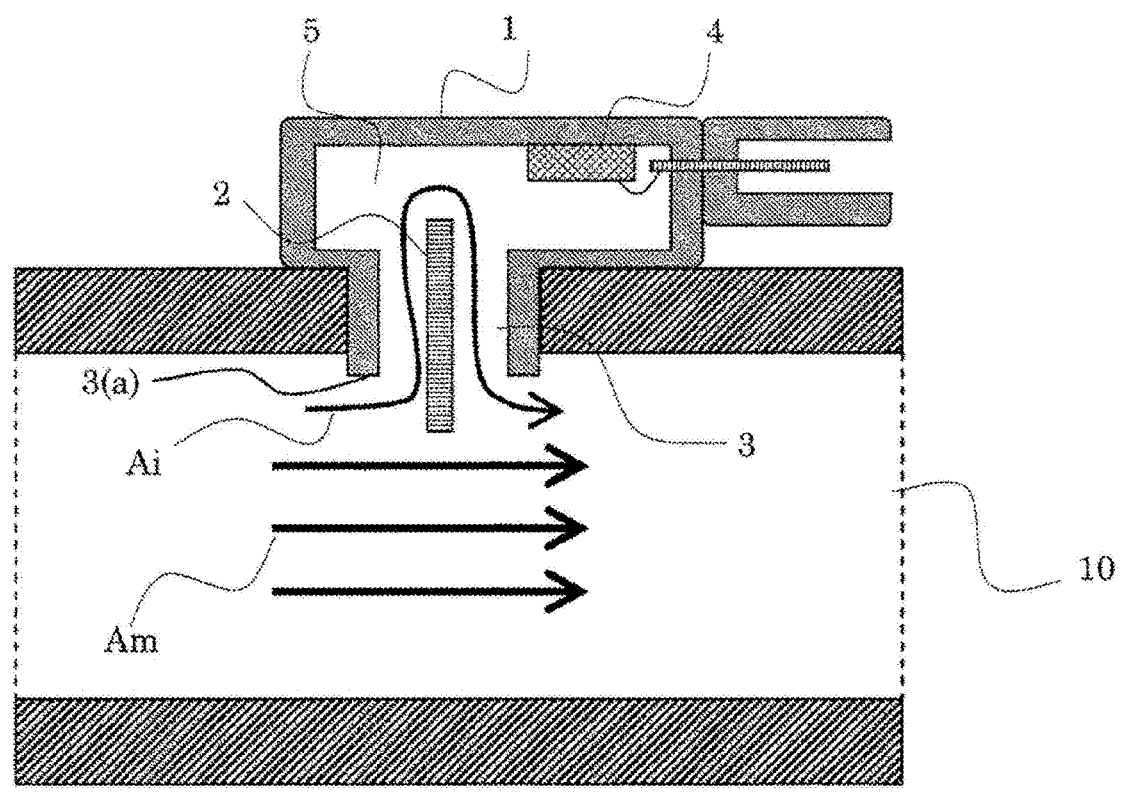
FIG. 2 is a schematic cross-sectional view of the first example of the present invention when attached to an intake pipe.
Figure 3:
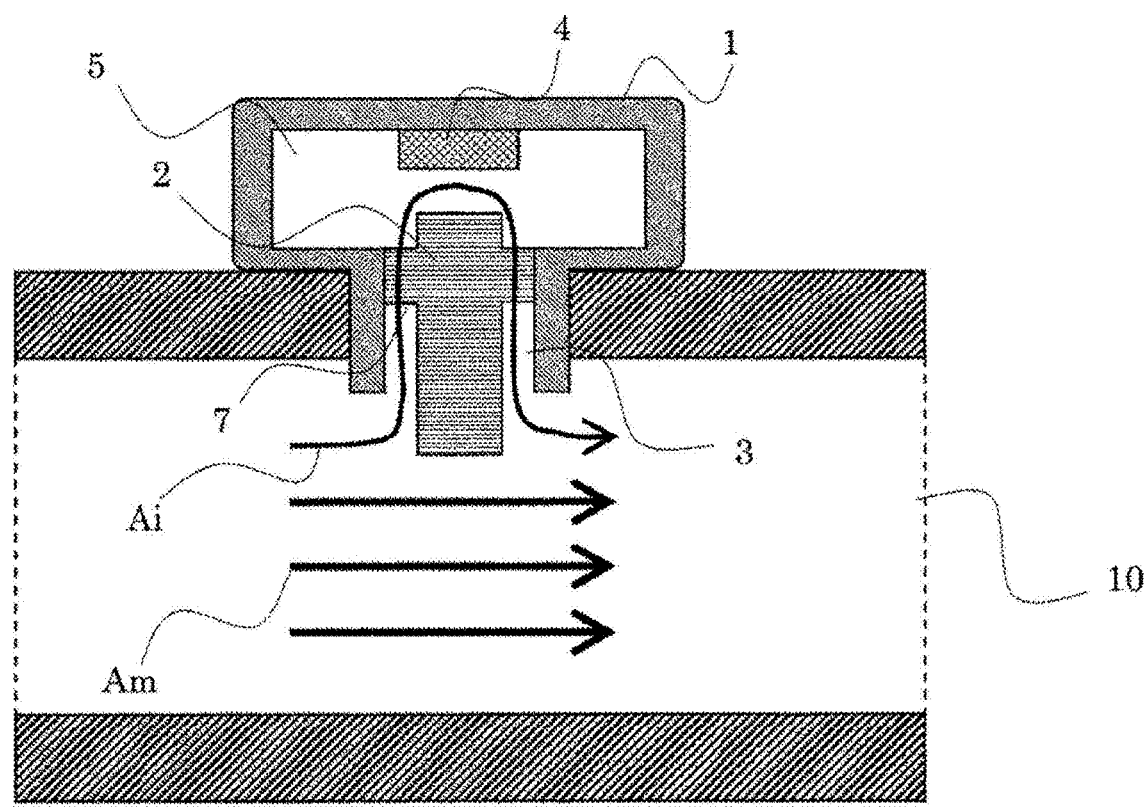
FIG. 3 is a schematic cross-sectional view of the first example of the present invention when attached to the intake pipe (at a mounting angle changed by 90°).

The advantageous effects of the present example will be described in detail with reference to FIGS. 2 and 3. FIGS. 2 and 3 are diagrams illustrating the thermal humidity measurement device 1 that is installed on an intake passage 10. FIG. 3 is a diagram illustrating a case where the thermal humidity measurement device 1 is installed on the intake passage 10 at a rotation of 90° with respect to the case illustrated in FIG. 2.

Figure 4:
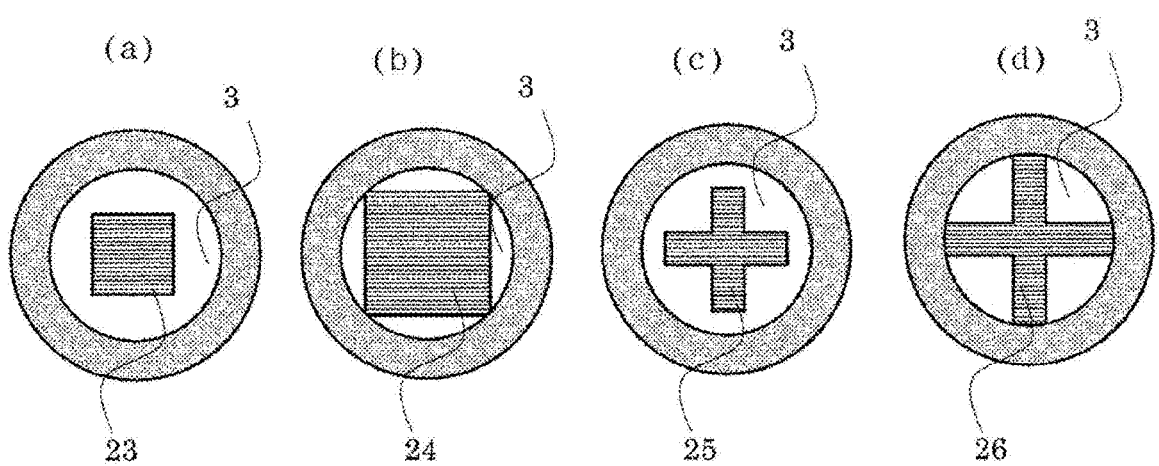
FIG. 4 is an enlarged schematic bottom view of an air introduction guide in each example of the present invention.

As illustrated in FIG. 2, the tip side of the air introduction guide 2 protrudes into: the inside of the intake passage 10 from an introduction port surface 3(a) of the air introduction pipe 3. In this configuration, when an air flow Am flows, part of the air flow Am hits the air introduction guide 2. At this time, the air pressure rises on the air flow upstream side of the air introduction guide 2 and decreases on the downstream side, thereby to generate an air flow Ai passing through the measurement chamber 5 as illustrated in FIG. 4. Thus, the air in the intake passage 10 is flown to a position close to the thermal humidity detection element 4. Therefore, it is possible to secure responsiveness.

Referring to FIG. 3, the air introduction guide 2 does not contact the inlet of the air introduction pipe 3 in the direction of the air flow Am. Therefore, as in the case illustrated in FIG. 2, the air having collided with the air introduction guide 2 is introduced into the air introduction pipe 3, and a main air flow Ai is generated to pass through the measurement chamber 5. On the way of the air flow Ai toward the measurement chamber 5, there is a connection member 7 for holding the air introduction guide 2 in a housing 37. In the present example, since the air introduction guide 2 does not block the inlet of the air introduction pipe 3, thereby producing a flow toward the measurement chamber 5. Therefore, the air flow Ai reaches the measurement chamber 5 flowing past the side of the connection member 7. This is an effect due to the presence of a portion where the air introduction pipe 3 and the air introduction guide 2 are not in contact with each other between the air introduction pipe 3 inlet and the connection member 7. For this reason, the air in the intake passage 10 is carried to a position close to the thermal humidity detection element 4, thereby achieving target responsiveness to a humidity change.

As described above, in the present example, the air introduction guide 2 is not in contact with the inlet of the air introduction pipe 3. In other words, when viewed from a direction perpendicular to the air introduction direction, the air introduction guide 2 has a portion not in contact with the inlet of the air introduction pipe 3 in all directions of 360°.

According to the present example, it is possible to ensure a high-speed response to a humidity change regardless of the direction of air flow. The high-speed response here refers to a response in a time shorter than the response time of the humidity sensitive film-type humidity sensor, which means, for example, that the output from the humidity sensor follows within one second after a step-wise humidity change with respect to time.

According to the present example, since the responsiveness can be secured regardless of the flow direction of the air, it is possible to support various layouts without limitation by the mounting direction of the thermal humidity detection device 1.

Moreover, according to the present example, the humidity measurement can be performed even in a place where the flow direction is not one direction as in the intake pipe. That is, the humidity detection device can be mounted also in a place such as the intake manifold 32 in which the air flows in not only one direction but in multiple directions (at random), which makes it possible to perform the humidity measurement close to the combustion chamber 21 which has been difficult in the past.

In particular, the intake manifold contains more contaminants such as water and dust than the intake pipe, but the thermal humidity detection element 4 is heated to a high temperature and can suppress temporal deterioration due to these contaminants. This is particularly advantageous for the humidity measurement at the intake manifold 32.

According to the present example, since the thermal humidity detection element 4 is also applicable to the intake manifold 32, the humidity in a place closer to the engine can be measured, thereby contributing to more accurate engine control.

The thermal humidity detection element 4 also dissipates heat due to the air flow, which causes a humidity measurement error due to the air flow. Therefore, as a further preferable example, disposing the thermal humidity detection element 4 in a place not exposed to the main air flow Ai makes it possible to suppress an error in humidity detection due to the air flow. Specifically, it is preferable to dispose the thermal humidity detection element 4 at a position hidden from the opening of the air introduction pipe 3.

Second Example

Second example of the present invention will be described below with reference to FIG. 4(a).

The present example is different from the first example in that an air introduction guide 23 has a square shape as viewed from the introduction direction. According to this configuration, even when the flow direction is different by 90°, the area in which the air collides with the air introduction guide 23 is the same, and the difference in responsiveness due to the flow can be reduced.

Although the square shape is taken as an example in the present example, the same effect can be obtained with a point-symmetrical shape such as a regular polygon shape or a circular shape. If the portion protruding from the air introduction pipe 3 of the air introduction guide 2 has a point-symmetrical shape as viewed from the introduction direction, the direction dependency of the air flow is reduced.

Third Example

A third example of the present invention will be described below with reference to FIG. 4(b).

The present example is different from the second example in that the four corners of the air introduction guide 23 are in contact with the inlet of the air introduction pipe 3. Even when the air flows from the direction of the four corners in contact, the air collides with the two surfaces that are adjacent to the contacting corner of the air introduction guide 23. These two surfaces have portions that are not in contact with the inlet of the air introduction pipe 3. The surfaces and the wall surface of the air introduction pipe 3 form inlet openings. Therefore, even when the air flows from the directions of the four corners, the flow of air into the measurement chamber 5 is generated.

As in the present example, the surfaces of an air introduction guide 24 colliding with the air flow include portions not in contact with the inlet of the air introduction pipe 3 in any air flow direction of 360°. Thus, the inlet portion of the air introduction pipe 3 is always present outside the air introduction guide 2. As a result, the air can be introduced into the measurement chamber 5 regardless of the flow direction of the air, which achieves a high-speed response in any direction of 360°.

In the present example, the tip of the fixing portion of the air introduction guide 2 fixed to the housing is up to the inlet of the air introduction pipe. This shortens the distance from the tip of the fixing portion to the tip of the guide portion and improves the vibration resistance.

Fourth Example

A fourth example of the present invention will be described below with reference to FIG. 4(c).

The present example is different from the second example in that an air introduction guide 25 has a cross shape as viewed from the introduction direction. According to the present example, there is a smaller difference among the areas of surfaces of the air introduction guide 25 collided by the flow of air from any direction of 360°, thereby further reducing the direction dependency of the air flow. In addition, in any direction, the air always collides with two or more surfaces of the air introduction guide 25, so it is easy to flow the air into the measurement chamber, which results in excellent responsiveness.

Fifth Example

A fifth example of the present invention will be described below with reference to FIG. 4(d).

The present example is different from the fourth example in that an air introduction guide 26 is in partial contact with the inlet of the air introduction pipe 3. In other words, the connection part 7 extends to the inlet.

Also in the present example, when viewed from a direction perpendicular to the air introduction direction, the air introduction guide 2 has a portion not in contact with the inlet of the air introduction pipe 3 in all directions of 360°. That is, the inlet portion of the air introduction pipe 3 surely exists more outside than the air introduction guide 2 as viewed from any direction perpendicular to the introduction direction such that the air having collided with the air introduction guide 2 is guided to the air introduction pipe 3.

Further, in the present example, as in the second example, it is possible to shorten the distance from the tip of the fixing portion to the tip of the guide portion, thereby providing excellent vibration resistance.

Sixth Example

Figure 5:
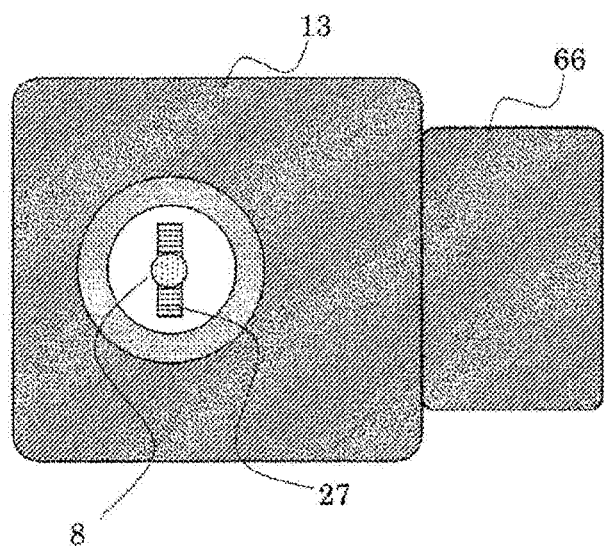
FIG. 5(a) is schematic bottom view.
FIG. 5(b) is a schematic cross-sectional view along A-A.
FIG. 5(c) is a schematic cross-sectional view along B-B of a sixth example of the present invention.
Figure 5:
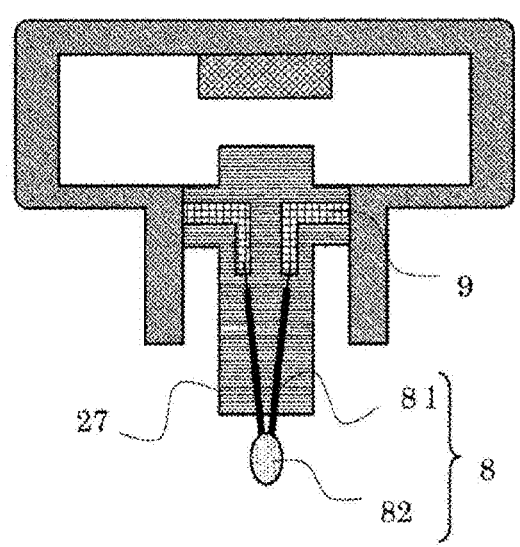
Figure 5:
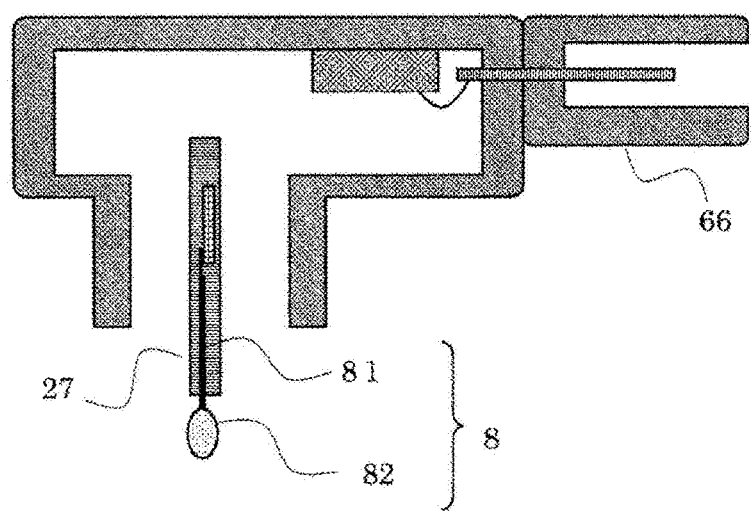

A sixth example of the present invention will be described with reference to FIG. 5

An air introduction guide 27 of the present example has not only a function of sending the air containing humidity as the measurement medium to the measurement chamber 5 but also has a function of holding a temperature sensor 8. The temperature sensor 8 includes a temperature detection element 82 that detects the temperature, and a temperature detection element lead 81.

In the air introduction guide 27, the temperature detection element 82 is exposed on the tip side, and a part of the temperature detection element lead 81 and a lead frame 9 electrically connected to the temperature detection element lead 81 are insert-fixed.

The temperature sensor 8 is preferably separated from the mounting wall surface in order to reduce the influence of heat transmitted from the internal combustion engine. On the other hand, the temperature detection element lead is weak in mechanical strength, and may suffer lead bending or the like due to the vibration of the internal combustion engine.

According to the present example, the temperature sensor 8 is held by the intake introduction guide 27, which makes it possible to improve the vibration resistance of the temperature sensor 8 while separating the temperature sensor 8 from the mounting wall surface. In particular, the mounting space can be effectively used, thereby realizing miniaturization of the sensor.

Further, according to the present example, the connection part between the lead 81 and the lead frame 9 is sealed in the air introduction guide 27, which makes it possible to avoid an electrical short circuit due to corrosion or water coverage.

As a further preferred example, the lead 81 may be coated with a resin and then sealed with a resin that forms the air introduction guide 27. The interface between the coating resin and the lead 81 is located inside the introduction guide 27. According to this configuration, the interface between the coating resin and the lead 81 is protected by the introduction guide 27, thereby achieving further improvement in the water resistance. In particular, coating the lead 81 with a material having higher adhesion to the resin forming the introduction guide 27 than the lead 81 makes it possible to further suppress the intrusion of water to the connection portion between the lead 81 and the lead frame 9.

According to the present example, a humidity detection device 13 integrated with the temperature measurement device 15 makes it possible to reduce the number of sensors mounted in the internal combustion engine. This contributes to the downsizing of an engine room and the reduction of wire harnesses. Also, as a matter of course, the present example can be combined with the above-described examples.

Seventh Example

Figure 6:
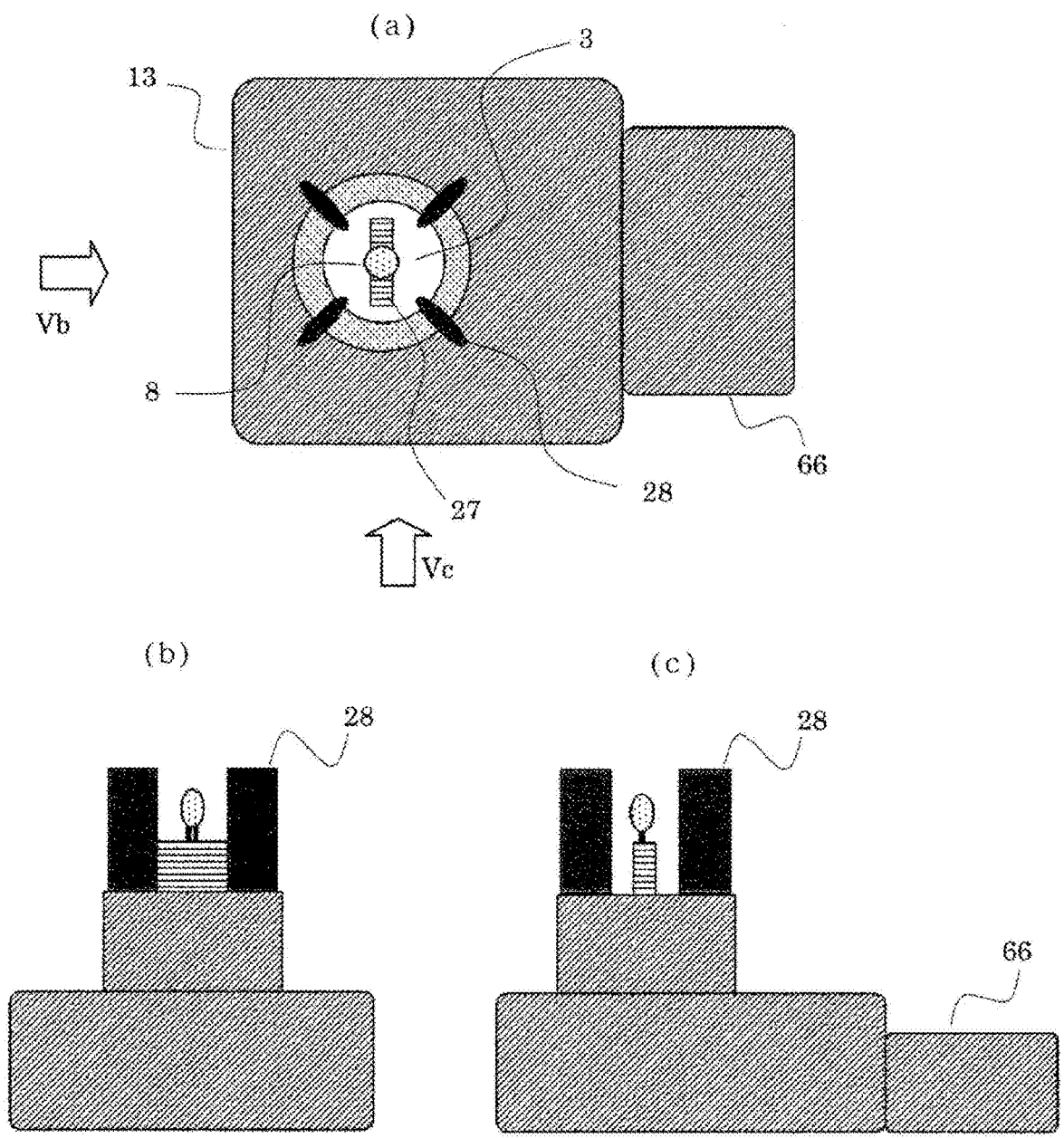
FIG. 6(a) is schematic bottom view.
FIG. 6(b) is a schematic front view (Vb side)
FIG. 6(c) is a schematic side view (Vc side) of a seventh example of the present invention.

A seventh example of the present invention will be described below with reference to FIG. 6.

In the present example, in addition to the configuration of the sixth example, an auxiliary air introduction guide 28 is disposed to project from an introduction opening surface 3(a) of an air introduction pipe 3. The effect of the auxiliary air introduction guide 28 is to collect a large amount of air flow Am into the introduction port of the air introduction pipe 3. In order to protect a temperature sensor 8, the auxiliary air introduction guide 28 may be extended toward the tip side beyond the temperature sensor 8. The temperature detection element 8 is protected because, for example, when a thermal humidity measurement device 14 is assembled into an intake passage 10 or the like, the temperature detection element 8 may bend due to touch with the edge of a mounting hole or may bend or break if the thermal humidity measurement device 14 is dropped.

Further, the effect of collecting the air flow Am at the introduction port of the air introduction pipe 3 is to improve the responsiveness of the thermal humidity measurement device 14 to changes in humidity and to apply the air flow Am to the temperature detection element 8 in order to reduce the temperature influence on the intake passage 10.

In the example illustrated in FIG. 10, the thermal humidity measurement device 14 is integrated with the temperature detection element 8. However, it is possible to obtain the effect of improving responsiveness to changes in humidity also by combining the temperature detection element 8 with the thermal humidity detection device 1 in which the temperature detection element 8 is not mounted.

Eighth Example

Figure 7:
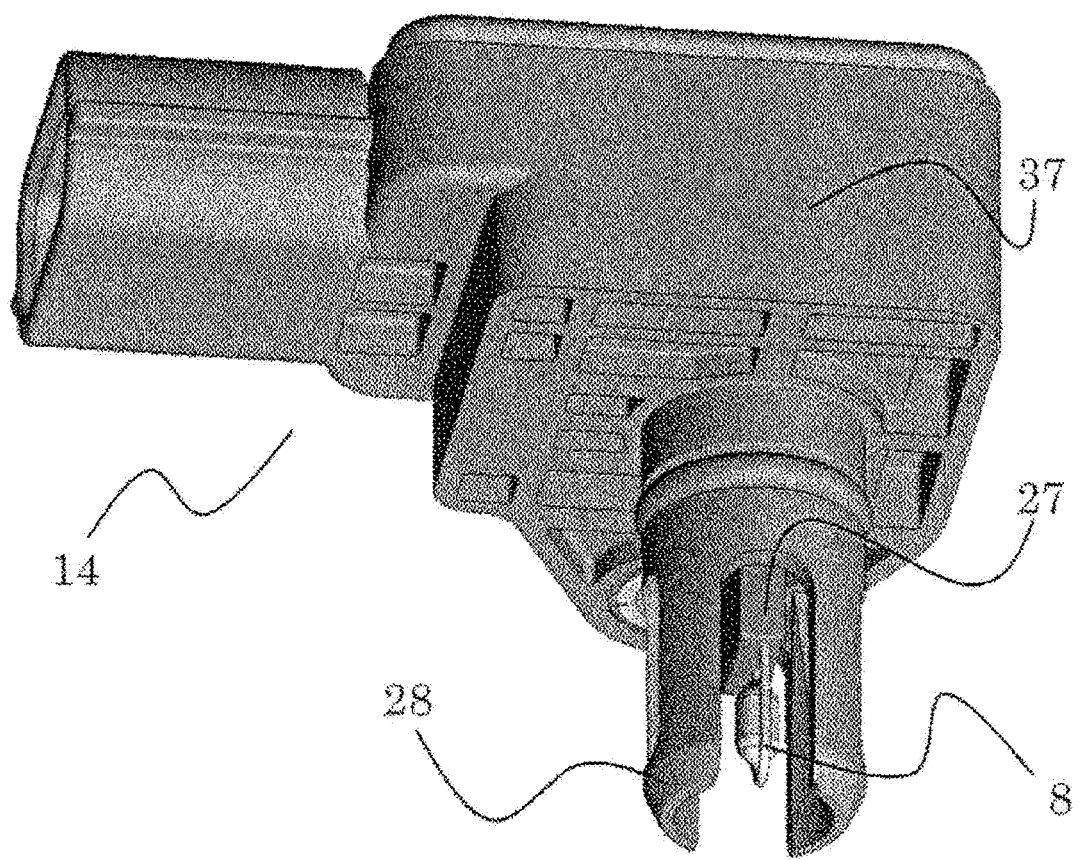
FIG. 7 is a schematic external perspective view of an eighth example of the present invention.

An eighth example of the present invention will be described below with reference to FIGS. 7 to 9. The present example is an example in which a further improvement is added to the seventh example.

Figure 9:
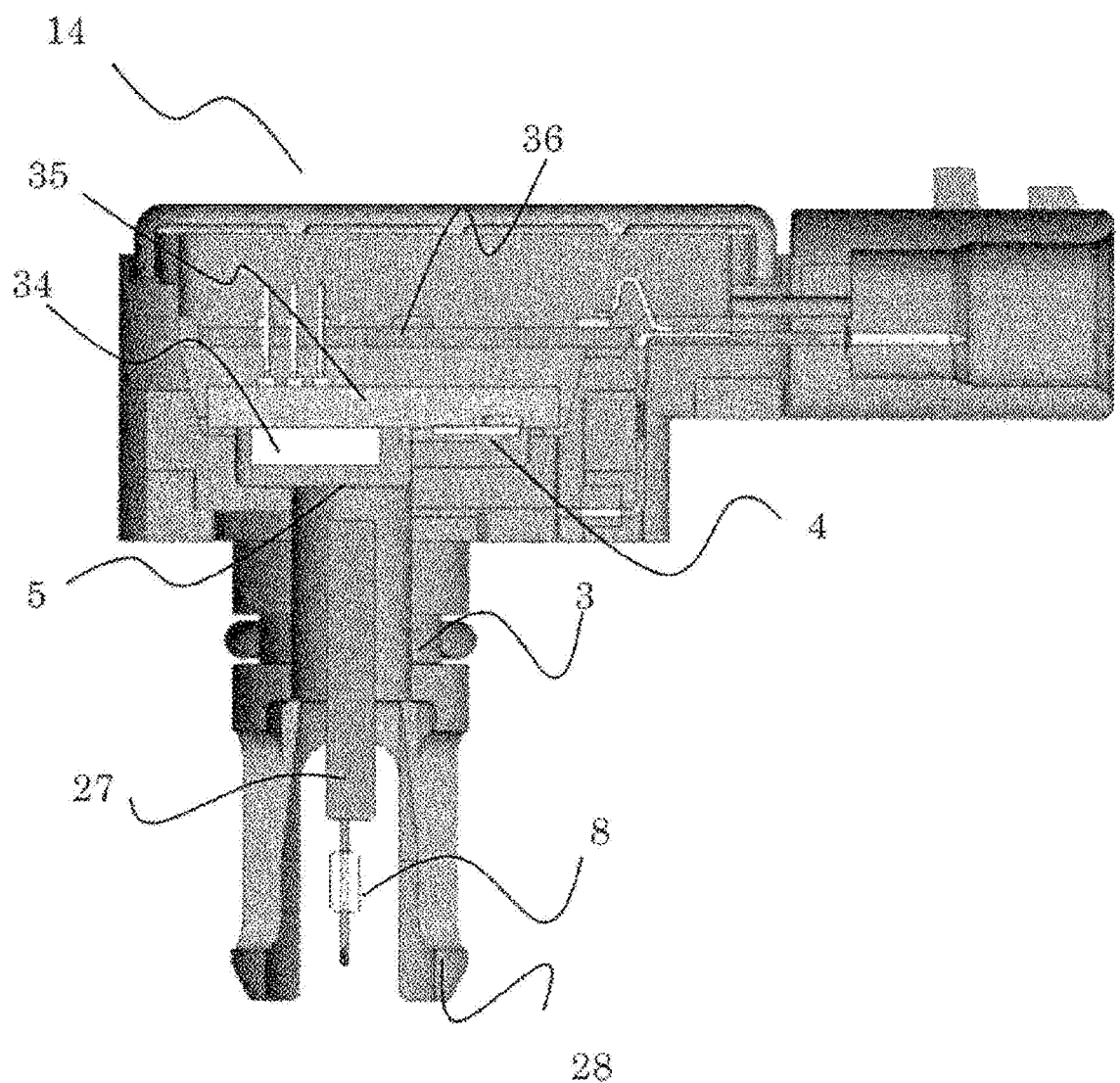
FIG. 9 is a schematic cross-sectional view of the eighth example of the present invention.

A humidity measurement device 14 of the present example includes a pressure detection element 34 in a measurement chamber 5 as illustrated in FIG. 9. In the present example, in addition to humidity and temperature, pressure can also be measured, which contributes to the downsizing of an engine room and the reduction of wire harnesses.

Figure 8:
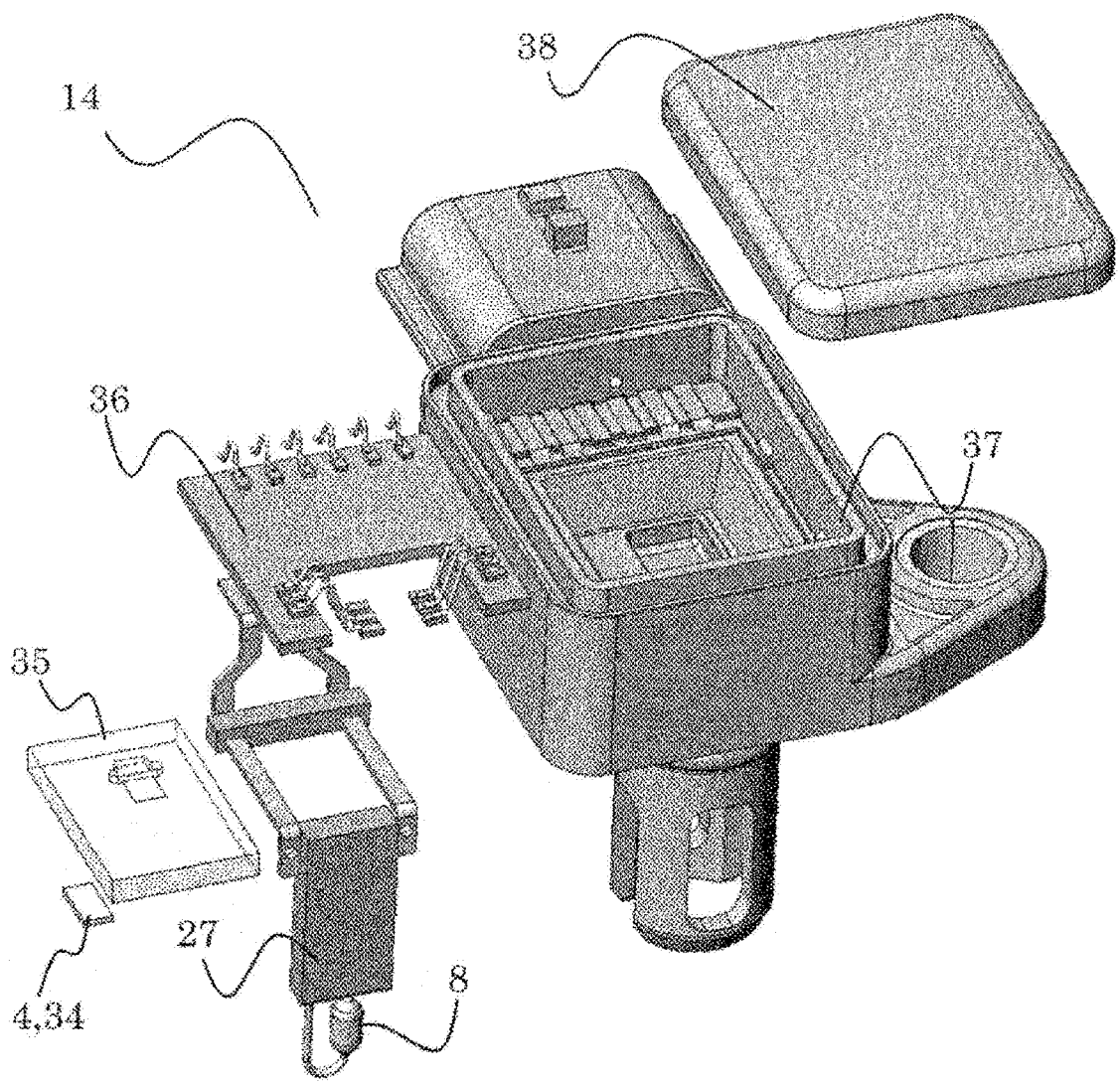
FIG. 8 is a schematic exploded perspective view of the eighth example of the present invention.

Further, as illustrated in FIGS. 8 and 9, the humidity measurement device 14 has a two-tier structure in which a second support substrate is disposed on the upper side (cover side) of a first support substrate 34. The second support substrate has a partially cutaway shape such that the substrates are electrically conducted by wire bonding via the opening of the cutaway portion. This allows efficient use of the space, thereby achieving miniaturization.

The first support substrate 35 has sensor elements 4 and 34 mounted thereon and is exposed to a measurement medium. The first support substrate 35 is made of a material having high corrosion resistance such as a ceramic substrate. A second support substrate 36 has resin package parts such as a microcomputer mounted thereon. The second substrate 36 is made of a material having a small difference in linear expansion coefficient from a resin constituting a resin package such as a printed board. This makes it possible to achieve both the improvement of corrosion resistance and the improvement of reliability of the resin package.

The pressure detection element 34 and the humidity sensor 4 may be formed on different chips or formed on the same chip.

Reference Example

Figure 11:
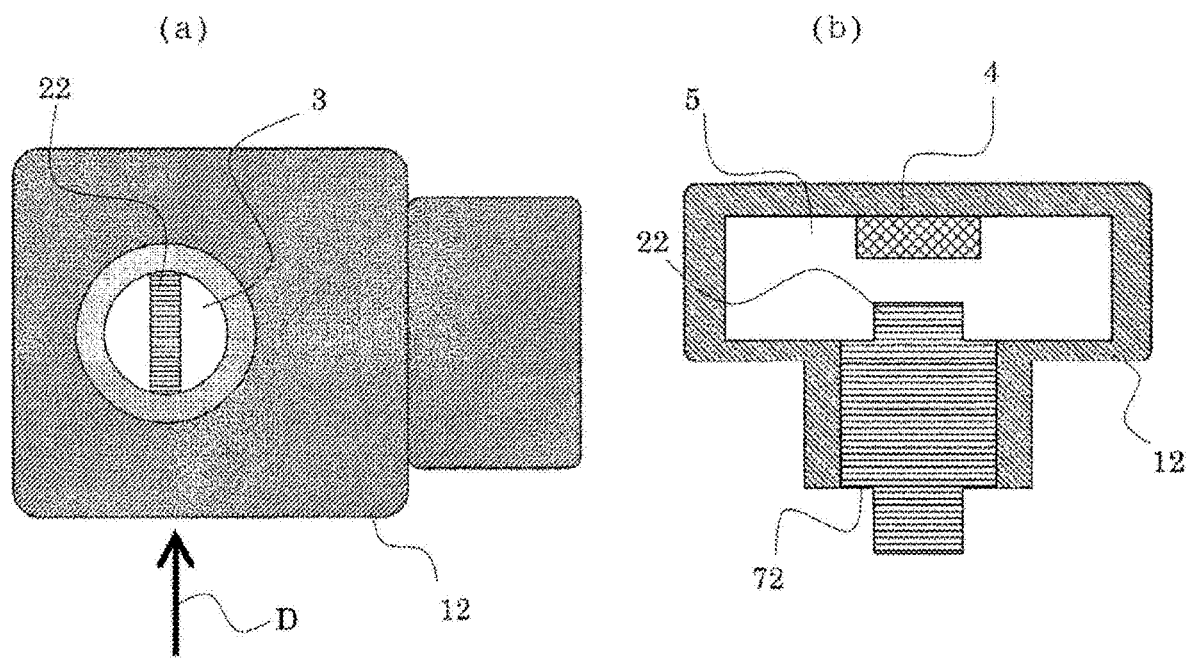
FIG. 11(a) is schematic bottom view and FIG. 11(b) is a schematic cross-sectional view along A-A of a reference example.
Figure 12:
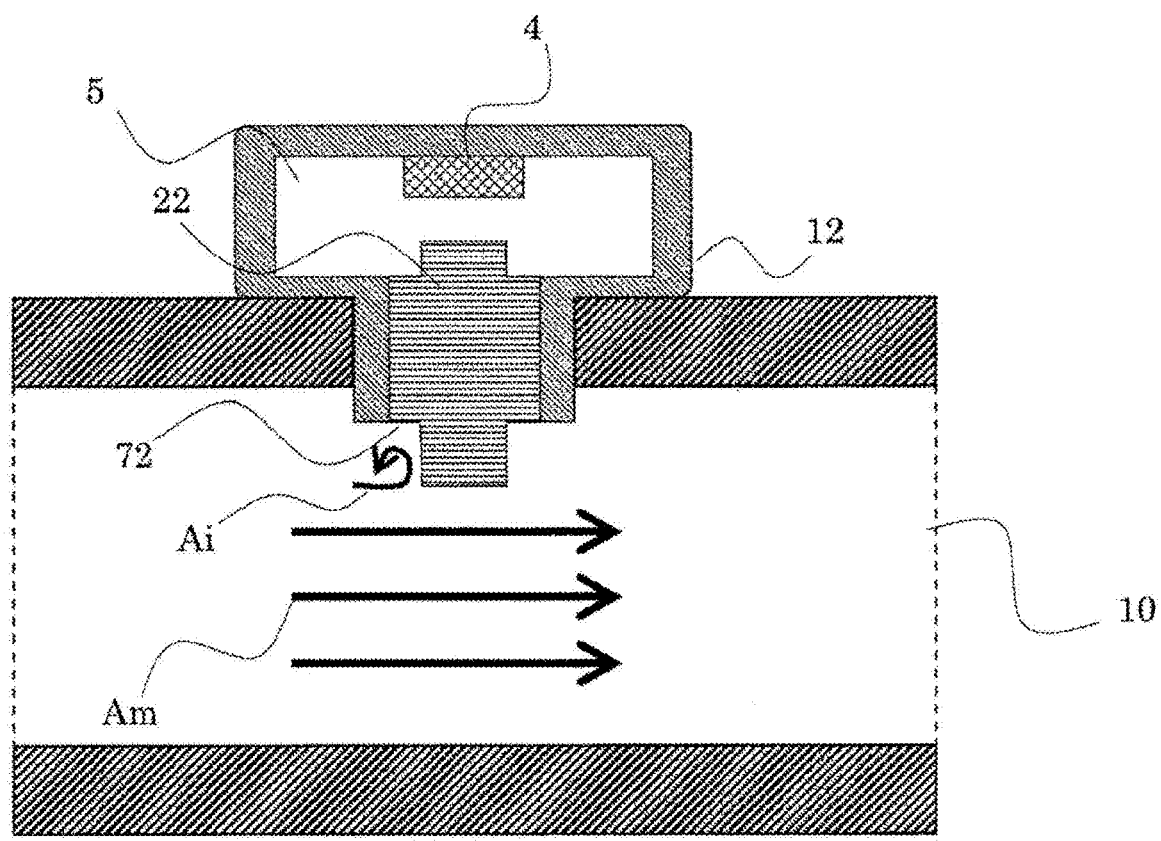
FIG. 12 is a schematic cross-sectional view of the reference example when attached to an intake pipe.

FIGS. 11 and 12 illustrate a reference example in which it is not possible to ensure a high-speed response to humidity change in some directions of air flow. When the direction of air flow is D or a direction opposite 180° to D, a response takes five seconds or more, and it is not possible to ensure a high-speed response to humidity change.

FIG. 11 illustrates a reference example in which the thermal humidity measurement device 12 is mounted on the intake passage 10 so that the air flow Am is in the direction of D. Even when the air flow Am hits an air introduction guide 22, a connection member 72 blocks the route to the measurement chamber 5 and thus an air flow Ai toward the measurement chamber 5 is unlikely to occur. For this reason, in the reference example as illustrated in FIG. 11, it is not possible to ensure a high-speed response to humidity change.

REFERENCE SIGNS LIST 1 thermal humidity measurement device
2 air introduction guide
3 air introduction pipe
3(a) introduction port surface
3(b) inlet opening
3(c) Inlet portion
4 thermal humidity detection element
5 measurement chamber
6 connection terminal
7 connection member
8 temperature sensor
9 lead frame
10 intake passage
11 conventional thermal humidity measurement device
12 thermal humidity measurement device
13 thermal humidity measurement device (integrated with temperature sensor)
14 thermal humidity measurement device (integrated with temperature sensor and pressure detection element)
15 pressure measurement device 16 temperature measurement device
17 flow rate measurement device
18 air cleaner
19 intercooler
20 throttle valve
21 combustion chamber
22 air introduction guide
23 air introduction guide
24 air introduction guide
25 air introduction guide
26 air introduction guide
27 air introduction guide
28 auxiliary air introduction guide
30 EGR valve
31 EGR cooler
32 intake manifold
33 exhaust catalyst
34 pressure detection element
35 first support substrate
36 second support substrate
37 housing
38 cover
66 wiring connector
72 connection member
81 temperature detection element lead
82 temperature detection element
Am air flow
Ai air flow
D direction of air flow
Vb direction to see FIG. 10(b)
Vc direction to see FIG. 10(c)

The invention claimed is:

1. A humidity measurement device comprising:
a measurement chamber in which a humidity detection element is mounted;
an introduction pipe arranged to introduce a measurement medium into the measurement chamber; and
an air introduction guide protruding from an inlet opening of the introduction pipe, wherein
the air introduction guide has a portion not in contact with the inlet opening of the introduction pipe in all directions of 360° as viewed from a direction perpendicular to an air introduction direction,
wherein a temperature sensor is disposed on a tip side of the air introduction guide.

2. The humidity measurement device according to claim 1, wherein the portion of the air introduction guide protruding from the introduction pipe has a rectangular cross-section shape on a surface perpendicular to the introduction direction.

3. The humidity measurement device according to claim 1, wherein
the temperature sensor has a wiring lead coated with a corrosion resistant material, and
an interface between the wiring lead and the corrosion resistant material is covered by the air introduction guide.

4. The thermal humidity measurement device according to claim 1, wherein the humidity detection element is a thermal type.

5. The thermal humidity measurement device according to claim 4, wherein the humidity detection element is disposed at a position hidden from the opening of the introduction pipe.

6. The thermal humidity measurement device according to claim 5, further comprising a pressure detection element.

7. The thermal humidity measurement device according to claim 6, comprising:
a ceramic substrate on which the pressure detection element and the humidity detection element are mounted; and
a printed board that is provided on an upper side of the ceramic substrate and has a resin package component mounted thereon.

8. The thermal humidity measurement device according to claim 7, wherein the printed board is in a partially cutaway shape, and the ceramic substrate and the printed board are electrically conducted via wire bonding passing through the opening.

9. A vehicle system in which the thermal humidity measurement device according to claim 4 is mounted on an intake manifold and a fuel injection amount is controlled using a signal from the thermal humidity measurement device.

10. A humidity measurement device comprising:
a measurement chamber in which a humidity detection element is mounted;
an introduction pipe arranged to introduce a measurement medium into the measurement chamber; and
an air introduction guide protruding from an inlet opening of the introduction pipe, wherein
the air introduction guide has a portion not in contact with the inlet opening of the introduction pipe in all directions of 360° as viewed from a direction perpendicular to an air introduction direction,
wherein the portion of the air introduction guide protruding from the introduction pipe has a point-symmetrical cross-section shape on a surface perpendicular to the introduction direction.

11. The humidity measurement device according to claim 10, wherein the portion of the air introduction guide protruding from the introduction pipe has a cruciform cross-section shape on the surface perpendicular to the introduction direction.

12. A humidity measurement device comprising:
a measurement chamber in which a humidity detection element is mounted;
an introduction pipe arranged to introduce a measurement medium into the measurement chamber; and
an air introduction guide protruding from an inlet opening of the introduction pipe, wherein
the air introduction guide has a portion not in contact with the inlet opening of the introduction pipe in all directions of 360° as viewed from a direction perpendicular to an air introduction direction,
wherein an auxiliary air introduction guide is provided on an introduction port surface of the introduction pipe.

* * * * *